United States Patent Office 3,361,763
Patented Jan. 2, 1968

3,361,763
SPIRO-[2,2-DITHIOLANE AND -DITHIANE] DERIVATIVES
Martin A. Davis, Montreal, Quebec, and James R. Watson, St. Laurent, Quebec, Canada, assignors to American Home Products Corporation, New York, N.Y., a corporation of Delaware
No Drawing. Filed Sept. 14, 1965, Ser. No. 487,325
9 Claims. (Cl. 260—327)

This invention relates to novel chemical compounds having useful biological activities. In particular, this invention relates to 1,3-dithiolane and 1,3-dithiane derivatives fused in position 2 with a 5H-dibenzocycloheptenyl radical so as to form a spiro system. The compounds of this invention may be represented by the following generic formula:

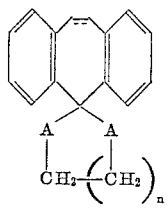

in which the symbol A represents divalent sulfur or the sulfone group $SO_2$ and $n$ represents an integer, either 1 or 2.

The compounds of this invention have antibacterial and trichomonicidal activities and are useful as antibacterial and trichomonicidal agents. As antibacterial agents, they are effective against: *Staph. pyogenes* (penicillin-sensitive and penicillin-resistant strains), *Sarcina lutea, Strept. fecalis, E. coli, A. aerogenes, S. pullorum, Ps. aeruginosa, Pr. mirabilis* and *Pr. vulgaris*. As trichomonicidal agents, they are effective against *T. vaginalis* and *T. foetus*.

The compounds of this invention may be formulated as antibacterial agents in the forms of lotions, creams, or ointments containing from 0.1 to 1% of the active ingredient, and suitable excipients. Such lotions, creams, or ointments may be advantageously applied topically to infected areas of the skin several times daily. As trichomonicidal agents, the compounds of this invention may be formulated with suitable excipients in the form of vaginal suppositories or vaginal inserts containing from 50 mg. to 500 mg. of the active ingredients, and may be administered twice daily for periods of time of from two to several weeks.

More specifically, the dithiolane and the dithiane derivatives of this invention may be prepared by the following route: a solution of a 5H-dibenzo[a,d]cyclohepten-5-one and 1,2-ethanedithiol or 1,3-propanedithiol in glacial acetic acid containing a suitable acid catalyst, such as, for example, boron trifluoride etherate, p-toluenesulfonic acid, or zinc chloride, is kept at room temperature for a period of time of from one to twenty days. The reaction product precipitates and is isolated by filtration. It may be purified by recrystallization from the appropriate solvent.

Surprisingly, the corresponding oxygen heterocyclic analogues may not be prepared from the dibenzocyclohepten-5-ones and alkylene glycols under the above conditions, not even under forcing conditions.

The dithiolanes and dithianes of this invention may be further treated with suitable oxidizing agents to form the corresponding 1′,1′,3′,3′-tetroxides. Advantageously, one can employ as oxidizing agent a percarboxylic acid, such as, for example, m-chloroperbenzoic acid, in a suitable solvent such as, for example, dichloromethane. Alternatively, one may use as oxidizing agent hydrogen peroxide in glacial acetic acid solution.

The following formulae and examples will illustrate this invention.

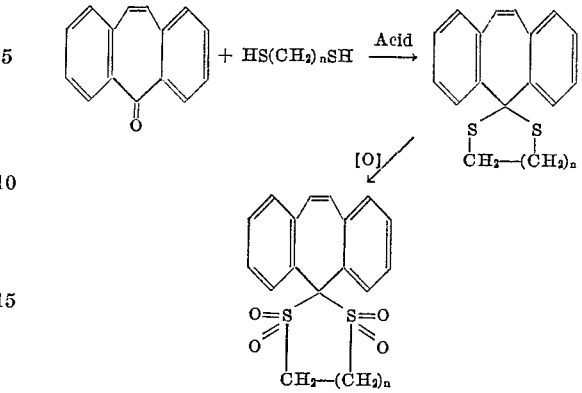

EXAMPLE 1

*Spiro{10,11-dihydro-5H-dibenzo[a,d]cycloheptene-5,2′-(1′,3′-dithiolane)}*

To a mixture of 10,11-dihydro-5H-dibenzo[a,d]-cyclohepten-5-one (41.6 g., and 0.2 mole) and 1,2-ethanedithiol (56.0 g., 0.6 mole) in glacial acetic acid (100 ml.) boron trifluoride etherate (60 ml.) is added and the mixture is kept in the dark at room temperature for 3 weeks. The title compound is isolated by filtration and recrystallized from the ethyl acetate to M.P. 104–105° C., and its composition is confirmed by elementary analysis.

EXAMPLE 2

*Spiro{5H-dibenzo[a,d]cycloheptene-5,2′-(1′-3′-dithiolane)}*

To a mixture of 5H-dibenzo[a,d]-cyclohepten-5-one (4.1 g., 0.02 mole) and 1,2-ethanedithiol (5.6 g., 0.06 mole) in glacial acetic acid (15 ml.) boron trifluoride etherate (6 ml.) is added and the mixture is allowed to stand in the dark at room temperature for 4 days. The title compound separates and is isolated by filtration. It is recrystallized from toluene to M.P. 206–207° C., and its composition is confirmed by analysis.

EXAMPLE 3

*Spiro{5H-dibenzo[a,d]-cycloheptene-5,2′-(1′-3′-dithiane)}*

To a mixture of 5H-dibenzo[a,d]-cyclohepten-5-one (51.6 g., 0.25 mole) and 1,3-propanedithiol (67.6 g., 0.062 mole) in glacial acetic acid (250 ml.) boron trifluoride etherate (70 ml.) is added and the mixture is allowed to stand in the dark at room temperature for 6 days. The reaction product separates and is isolated by filtration. Recrystallization from chloroform ether yields the title compound with M.P. 212–213° C., and analysis confirms its composition.

EXAMPLE 4

*Spiro{10,11-dihydro-5H-dibenzo[a,d]cycloheptene-5,2′-(1′,3′-dithiolane) 1′,1′,3′,3′-tetroxide}*

To a solution of the dithiolane obtained as in Example 1 (25.0 g., 0.09 mole) in dichloromethane (150 ml.) there is added dropwise under constant stirring m-chloroperbenzoic acid (85.0%) (75.0 g., 0.352 mole +5% excess) in dichloromethane (1000 ml.). The precipitate which forms after some standing consists of m-chlorobenzoic acid and the title compound. The latter is isolated by trituration with anhydrous ether in which the tetroxide is insoluble. Recrystallization from nitromethane yields the title compound with M.P. 204–205° C., and analysis confirms its composition.

EXAMPLE 5

*Spiro{5H-dibenzo[a,d]cycloheptene-5,2'-(1',3'-dithiolane)} 1',1',3',3'-tetroxide*

(a) To a solution of spiro{5H-dibenzo[a,d]cycloheptene-5,2'-(1',3'-dithiolane)} obtained as in Example 2, (8.5 g., 0.03 mole) in dichloromethane (250 ml.) there is added dropwise with stirring m-chloroperbenzoic acid (82.3%), (25.4 g., 0.12 mole) in dichloromethane (400 ml.). The first two moles of oxidant are taken up immediately, the third mole after one half hour and the fourth after fifteen hours. Trituration against sodium thiosulfate indicates a total peracid consumption of 98.5%. A white precipitate of m-chlorobenzoic acid begins to form after one hour. This is removed by filtration and the filtrate is treated as follows: The excess peracid is destroyed with 10% sodium bisulfate solution and the organic layer washed with 5% sodium bicarbonate solution and water. The organic solution is dried over sodium sulphate and the solvent removed in vacuo to afford a yellow-solid M.P. 212–213° (dec.). Recrystallization from nitro-methane gives the title compound as white plates with M.P. 215–216° (dec.).

An alternate method of isolation of the product involves evaporation of the reaction mixture followed by washing of the residue with ether; the insoluble disulfone remains behind and is purified as above.

(b) A solution of the above starting material (14.1 g., 0.05 mole) in acetic acid-dichloromethane (600 ml.) is treated with 30% hydrogen peroxide (28.3 g., 0.25 mole). It is kept at 70° C. for four hours, an equal amount of peroxide is added and the heating continued for a further four hours. The following day the crystals are collected and combined with those obtained by concentration of the mother liquors. Recrystallization from nitromethane-ether gives the title product, with M.P. 216–217° (dec.). Elemental analysis confirms its composition.

EXAMPLE 6

*Spiro{5H-dibenzo[a,d]-cycloheptene-5,2'-(1',3'-dithiane)}-1',1',3',3'-tetroxide*

To a solution of spiro{5H-dibenzo[a,d]cycloheptene-5,2'-(1',3'-dithiane)} obtained as in Example 3, (8.9 g., 0.03 mole) in dichloromethane (225 ml.) there is added dropwise with stirring, m-chloroperbenzoic acid (82.3%) (25.4 g., 0.12 mole) in dichloromethane (400 ml.). The uptake of peracid is similar to that described in Example 5. The product is obtained by triturating the precipitate with ether in which m-chlorobenzoic acid is soluble while the tetroxide is not. The white solid obtained after drying in vacuo has M.P. 159–162° (dec.). When the filtrate is worked up as in Example 5, an additional amount of product is obtained with M.P. 154–156° (dec.). The combined crops are recrystallized from dimethylformamide yielding the title compound as white plates with M.P. 167–168° (dec.). Elemental analysis confirms this composition.

We claim:

1. A compound of the formula

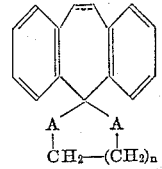

wherein A is selected from the group which consists of sulfur and sulfone and wherein $n$ represents an integer selected from the group consisting of 1 and 2.

2. A compound of the formula

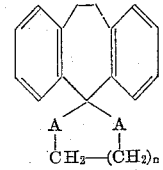

wherein A is selected from the group which consists of sulfur and sulfone and wherein $n$ represents an integer selected from the group consisting of 1 and 2.

3. A compound of the formula

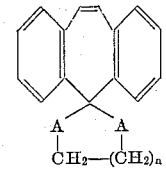

wherein A is selected from the group which consists of sulfur and sulfone and wherein $n$ represents an integer selected from the group consisting of 1 and 2.

4. Spiro{10,11 - dihydro-5H-dibenzo[a,d]cycloheptene-5,2'-(1',3'-dithiolane)}.

5. Spiro{5H - dibenzo[a,d]cycloheptene-5,2'-(1',3'-dithiolane)}.

6. Spiro{5H - dibenzo[a,d]cycloheptene-5,2'-(1',3'-dithiane)}.

7. Spiro{10,11 - dihydro-5H-dibenzo[a,d]cycloheptene-5,2'-(1',3'-dithiolane)-1',1',3',3'-tetroxide}.

8. Spiro{5H - dibenzo[a,d]cycloheptene-5,2'-(1',3'-dithiane)}-1',1',3',3'-tetroxide.

9. Spiro{5H - dibenzo[a,d]-cycloheptene-5,2'-(1',3'-dithiane)}-1',1',3',3'-tetroxide.

References Cited

Loewenthal, J. Chem. Soc., (1958), pp. 1367–1375.

JAMES A. PATTEN, *Primary Examiner.*